United States Patent

Simpson et al.

[11] Patent Number: 5,952,404
[45] Date of Patent: *Sep. 14, 1999

[54] GLOSS EMULSION PAINTS

[75] Inventors: Leslie Ainsley Simpson, Normanby; Keith Robson, Durham; Steven Hugh Ashdown, Darlington; Lisa Blakey, Yarm, all of United Kingdom

[73] Assignee: Tioxide Group Services Limited, London, United Kingdom

[ * ] Notice: This patent issued on a continued prosecution application filed under 37 CFR 1.53(d), and is subject to the twenty year patent term provisions of 35 U.S.C. 154(a)(2).

[21] Appl. No.: 08/574,875

[22] Filed: Dec. 19, 1995

[30] Foreign Application Priority Data

Jan. 11, 1995 [GB] United Kingdom .................. 9500497

[51] Int. Cl.$^6$ .............................. C08L 33/04; C08L 63/10
[52] U.S. Cl. ......................... 523/221; 523/220; 524/406; 524/407; 524/408; 524/413; 524/432; 524/433; 524/522; 524/523; 524/524
[58] Field of Search ............................ 523/221; 524/220, 524/406, 407, 48, 413, 432, 433, 522, 523, 524

[56] References Cited

U.S. PATENT DOCUMENTS 4,110,292  8/1978  Sekmakas et al. ...................... 524/379
5,344,487  9/1994  Whalen-Shaw .......................... 106/416
5,385,960  1/1995  Emmons et al. ......................... 523/205

FOREIGN PATENT DOCUMENTS

| 0 549 163 A1 | 6/1993 | European Pat. Off. . |
| 61-51061 | 3/1986 | Japan . |
| 2 214 514 | 9/1989 | United Kingdom . |
| 2 217 334 | 10/1989 | United Kingdom . |
| 2 267 503 | 12/1993 | United Kingdom . |
| WO 93/11183 | 6/1993 | WIPO . |
| WO 93/12183 | 6/1993 | WIPO . |
| WO 93/12184 | 6/1993 | WIPO . |

*Primary Examiner*—Marion McCamish
*Assistant Examiner*—John J. Guarriello

[57] ABSTRACT

An aqueous gloss emulsion paint comprises a dispersion of structured composite particles, said structured particles comprising an association of particles of inorganic pigment and polymeric particles. The polymeric particles are formed from a polymer or copolymer having a minimum film forming temperature not greater than 50° C. The component particles of the composite particles are held in association as a result of surface charges on the particles said surface charges on the polymeric particles being of opposite sign to the surface charge on the particles of inorganic pigment. The ratio of polymeric particles to particles of inorganic pigment in the composite particles is from 0.5:1 to 6:1 by volume.

20 Claims, No Drawings

GLOSS EMULSION PAINTS

This invention relates to gloss emulsion paints and, in particular, to gloss emulsion paints containing structured composite pigments.

It is generally considered difficult to produce an aqueous emulsion paint which will form a high gloss film when coated on a surface because, in contrast to solvent-based paints where the pigment is dispersed in a solution of the film-forming polymer, the film-forming polymer and the pigment are separately and discretely dispersed in the system. During the drying of aqueous paints pigment particles tend to flocculate to form agglomerates which are large enough to produce surface asperities in the dried film. The presence of these surface asperities increases the scattering of light by the paint surface, hence reducing the specular reflectance and gloss.

It is an object of this invention to provide gloss emulsion paints with improved gloss in the dried film.

According to the invention an aqueous gloss emulsion paint comprises a dispersion of structured composite particles, said structured composite particles comprising an association of at least one particle of an inorganic pigment with at least one polymeric particle, the polymeric particle being formed from a polymer or copolymer having a minimum film-forming temperature not greater than 50° C., the structured composite particles having a composition such that the ratio of polymeric particles to particles of inorganic pigment is in the range 0.5:1 to 6:1 by volume, the particles of inorganic pigment having a surface charge and the polymeric particles having a surface charge, said surface charge on the polymeric particles being positive when the particles of inorganic pigment have negative surface charge and negative when the particles of inorganic pigment have a positive surface charge, the particles of inorganic pigment and the polymeric particles being held in association in the structured composite particles as a result of said surface charges.

Also according to the invention a process of preparing an aqueous gloss emulsion paint comprising a dispersion of structured composite particles, said structured composite particles comprising an association of at least one particle of an inorganic pigment with at least one polymeric particle, comprises dispersing particles of said inorganic pigment in an aqueous medium at a pH at which said particles have a surface charge and dispersing said polymeric particles in an aqueous medium wherein said polymeric particles have a surface charge, said surface charge on the polymeric particles being positive when the dispersed particles of inorganic pigment have a negative surface charge and negative when the dispersed particles of inorganic pigment have a positive surface charge, mixing the dispersed particles of inorganic pigment with the dispersed polymeric particles under conditions such that the mixing does not produce a reversal of the sign of the surface charge on one of the particulate materials, thus forming structured composite particles in which the particles of inorganic pigment and the polymeric particles are held in association as a result of said surface charges the polymeric particles being formed from a polymer or copolymer having a minimum film-forming temperature not greater than 50° C. and the structured composite particles having a composition such that the ratio of polymeric particles to particles of inorganic pigment is in the range 0.5:1 to 6:1 by volume.

Commonly, emulsion paints are formulated to have a pH value in the range 6 to 10. It is often preferred to prepare the dispersions of composite particles according to this invention at a pH value outside this range. Consequently, in a preferred process according to the invention the pH value of the dispersion of composite particles is adjusted to a value in the range 6 to 10 after formation of the structured composite particles.

The product of this process in which the pH is adjusted to a value in the range 6 to 10 after formation of the structured composite particles is a preferred product of the invention.

Hence, also according to the invention an aqueous gloss emulsion paint comprises a dispersion of structured composite particles, said structured composite particles comprising an association of at least one particle of an inorganic pigment with at least one polymeric particle, the polymeric particle being formed from a polymer or copolymer having a minimum film-forming temperature not greater than 50° C., the structured composite particles having a composition such that the ratio of polymeric particles to particles of inorganic pigment is in the range 0.5:1 to 6:1 by volume, the structured composite particles being obtainable by a process wherein particles of said inorganic pigment are dispersed in an aqueous medium at a pH at which said particles have a surface charge and said polymeric particles are dispersed in an aqueous medium wherein said polymeric particles have a surface charge, said surface charge on the polymeric particles being positive when the dispersed particles of inorganic pigment have a negative surface charge and negative when the dispersed particles of inorganic pigment have a positive surface charge, the dispersed particles of inorganic pigment are mixed with the dispersed polymeric particles under conditions such that the mixing does not produce a reversal of the sign of the surface charge on one of the particulate materials, thus forming structured composite particles in which the particles of inorganic pigment and the polymeric particles are held in association as a result of said surface charges and subsequently adjusting the pH of the dispersion of structured composite particles so formed to a value in the range 6 to 10.

This invention makes available gloss latex paints which form a dried film having an exceptionally high gloss. The 60° Gloss of these paint films as measured by specular glossmeter is normally greater than 70% and is frequently higher than 75%.

The inorganic pigment which forms one component of the composite particles of the current invention is any pigment which is normally used in an emulsion paint. Typical pigments include titanium dioxide pigments, zinc oxide pigments, antimony oxides, barium pigments, calcium pigments, zirconium pigments, chromium pigments, iron pigments, magnesium pigments, lead pigments, zinc sulphide and lithopone. Preferably, the pigment is titanium dioxide and, most preferably, rutile titanium dioxide.

The polymeric particle which forms another component of the composite particles can be formed from any polymer or copolymer which has a minimum film forming temperature as specified. Typical polymers and copolymers include polymers and copolymers of acrylic acid or substituted acrylic acids or of esters of acrylic acid or substituted acrylic acids, poly(styrene-acrylates), polyesters, polyurethanes, poly(urethane-acrylates), poly(styrene-butadiene), polyvinyl acetate polymers and copolymers and alkyd or epoxy resin emulsions.

The composite particles are formed from particles of at least one inorganic pigment and particles of at least one polymeric material. Also within the scope of the invention are composite particles formed from a plurality of inorganic pigments and/or a plurality of polymeric materials.

It is believed that the polymeric particles present in the composite particles of the invention coalesce and envelop the particles of inorganic pigment during the drying process which occurs after the gloss paint is applied to a substrate. Frequently, drying takes place at normal ambient temperatures although the invention encompasses gloss paints which are designed to be dried by the application of heat. The minimum film-forming temperature (MFFT) of the polymeric particles is therefore an important parameter. Preferably the MFFT of the particles is less than 25° C. and most preferably it is in the range 0° C. to 25° C.

The ratio of polymeric particles to inorganic pigment particles in the composite particles also affects the efficiency of the process in which the inorganic particles are enveloped in the polymer. Preferably, the bead to pigment ratio is in the range 1:1 to 4:1 by volume and the most preferred bead to pigment ratio is in the range 1.5:1 to 3:1 by volume.

When titanium dioxide is used in a preferred embodiment then its average crystal size is preferably between about 0.05 and 0.5 micrometer. For rutile titanium dioxide the average crystal size is most preferably between 0.2 and 0.3 micrometer and for anatase titanium dioxide the most preferable average crystal size is in the range 0.1 to 0.35 micrometer.

The preferred average size of the polymeric particles depends upon the average size of the inorganic particles with which they are associated since it is important to obtain composite particles having a structure which assists the formation of a smooth film as the paint dries. When titanium dioxide pigments are used having the average crystal sizes given above the polymeric particles preferably have an average size of from 0.02 to 0.5 micrometer. More preferably, the average size of the polymeric particles is from 0.05 to 0.2 micrometer.

In the process of this invention a dispersion of the particles of inorganic pigment is mixed with a dispersion of polymeric particles under conditions in which the particles of each component have opposite surface charges. In many commercially available dispersions of polymers the particles carry a negative surface charge. A preferred process of the invention therefore utilises a dispersion of inorganic pigment particles having a positive surface charge.

In this preferred embodiment the dispersion of inorganic pigment particles is formed at a pH below the isoelectric point of the particles. For example, a typical titanium dioxide pigment having a surface coating of alumina will have a positive surface charge when dispersed in water at a pH below about 6. A preferred process of the invention uses a dispersion of alumina-coated titanium dioxide prepared at a pH below 6 and more preferably between 4 and 6. When the titanium dioxide used is uncoated or has a coating containing silica the dispersions are preferably prepared at a pH value between 2 and 4.

The dispersions used in the process of the invention may be prepared by any suitable means. Most preferably the particulate inorganic pigment is stirred with water in the absence of a dispersing agent but, for the polymeric particles, it is often convenient to utilise a commercially available dispersion and such dispersions frequently contain dispersing agents. The presence of these dispersing agents usually does not prevent the use of such dispersions in the process of the invention. Importantly, it is likely that the use of a dispersing agent will effectively modify the isoelectric point of the material being dispersed and consequently will amend the pH values at which a positive or negative surface charge is present.

Preferably, the dispersion of inorganic pigment is subjected to a milling step to break down any aggregates present and to optimise the degree of dispersion of the particles. The milling can be carried out by, for example high speed impeller mill, ball mill, sand mill or the use of ultrasound.

The dispersions can be prepared at any suitable concentration but factors such as the viscosity of the dispersions of the components and the composite and the suitability of the product for use in a paint need to be considered. Generally, it is preferred to use dispersions of polymeric particles containing 40 to 65 per cent by weight and frequently the dispersion used contains 40 to 60 per cent polymeric particles by weight. The preferred concentration for the dispersion of inorganic pigments is from 50 to 80 per cent by weight.

The dispersions of the two components of the composite materials can be produced and used at different pH values but the process is simplified if the two dispersions have a substantially similar pH. Preferably, the two dispersions have pH values which differ by not more than 1 pH unit and, more preferably, the pH values differ by not more than 0.5 pH unit.

When the pH values of the two dispersions are substantially similar the product of the invention is readily prepared by mixing these two dispersions while the mixture is agitated by any suitable means. Adequate mixing of the two dispersions is effected, for example, by stirring, recirculatory mixing or by exposing the mixture to the effect of ultrasonic vibrations. Typically, one of the dispersions is added to the other dispersion slowly, or the two dispersions are simultaneously introduced into an agitated mixing zone.

It may be necessary, for example when a dispersion has poor stability at a pH value chosen for mixing, to prepare the two dispersions at substantially different pH values. When it is necessary to employ dispersions having substantially different pH values it is important to mix the dispersions under conditions such that the sign of the surface charge on either of the inorganic particles or the polymeric particles is not reversed by any changes in pH which may occur during mixing. For example it may be necessary to add an acid or a base to adjust the pH during the mixing step.

For example, a suitable pH value for producing a composite from alumina-coated titanium dioxide is about 4 to 5. However, commercially available polymeric particles are often supplied as a dispersion at a pH of about 7 to 9. Nevertheless, a product according to this invention can be formed from titanium dioxide and polymeric particles by adding a commercial dispersion of polymeric particles to a dispersion of titanium dioxide at a pH of 4 to 5 whilst the pH of the resultant mixture is maintained in the range of 4 to 5 by the simultaneous addition of an acid.

Generally, for any particular combination of inorganic pigment and polymer, there will be an optimum pH or range of pH values for carrying out the process of this invention. However, many aqueous paint systems are formulated to have a pH in the range 6 to 10 and included within the scope of this invention is a process carried out as hereinbefore described at a pH value outside the range 6 to 10 to form structured composite particles in which one or more particles of an inorganic pigment and one or more polymeric particles are held in association as a result of opposite surface charges on the particles and the pH of the resulting dispersion of composite particles is subsequently adjusted to a value in the range 6 to 10.

Preferably, when the pH is adjusted after the dispersion of composite particles is formed, it is adjusted to a value in the range 7 to 9.

A particularly preferred embodiment of the product of this invention is a dispersion of composite particles as hereinbefore defined having a pH in the range 6 to 10 and preferably 7 to 9. This product may be produced by preparing the dispersion of composite particles from separate dispersions of inorganic pigment particles and polymeric particles at a pH within one of these ranges or may be produced at a pH outside these ranges, the pH being subsequently adjusted to a value within one of the ranges.

Suitable choice of inorganic pigment, polymeric particles and concentrations and proportions of these components can produce a dispersion of composite particles which is useful as a gloss emulsion paint without further modification. Frequently, however, the dispersion will be used as the basis of a paint to which conventional paint additives are added to form a finished paint composition. For example, additional pigments or additional film-forming polymeric latex, not necessarily similar to that used in the structured composite, may be included using conventional processing techniques. Other ingredients such as dyes, antifoaming agents, coalescing solvents and thickeners may also be added.

The films formed from the paints of the current invention generally have high gloss and, in comparison with paints formed by conventional processes, the opacity of the film is increased, apparently because the structured nature of the composite particles results in a more even distribution of the pigment particles within an applied paint film. In contrast to paints utilising similar structured pigments based on polymeric particles having a relatively high film-forming temperature, the surface gloss of the film is not reduced compared to conventional paints. The specular gloss can be considerably higher than that of a conventionally-prepared paint and Atomic Force Microscopy has shown that films with a higher gloss contain smaller and fewer pigment-induced surface asperities.

The invention is illustrated by the following examples

EXAMPLE 1

A pigment slurry was prepared by dispersing 194 g of titanium dioxide (TIOXIDE TR92) in 169 g of demineralised water. The pH of the slurry was adjusted to 4.5 by addition of hydrochloric acid and the slurry was subjected to high shear milling to effect thorough dispersion. An experimental grade vinyl acetate/VeoVa polymer emulsion (44% solids) with an average particle size of 0.075 micrometer and a minimum film forming temperature of 8° C. was adjusted to pH 4.5, and then 200 g of emulsion was mixed with the pigment slurry under conditions of high shear agitation. The resultant dispersion of composite particles was adjusted to pH 8.5 by the addition of ammonia. The total dry solids of the composite dispersion was 50.1% by weight and the volume ratio of emulsion particles to pigment particles was 1.77:1.

A gloss paint was then prepared containing the composite pigment with additional vinyl acetate/VeoVa emulsion as the binder to give a total volume solids concentration of 30.0% and a pigment volume concentration of 18.0%. A paint made containing the same quantities of emulsion and pigment, but made in a manner consistent with conventional paint manufacture, was used as a standard. The paints had the following composition:

|  | Parts by weight | |
| --- | --- | --- |
|  | Standard Paint | Test Paint |
| Water | 80.00 | 80.00 |
| Hydroxyethyl cellulose (Cellosize QP44OOH) | 3.00 | 3.00 |
| Ammonia (0.88) | 2.32 | 2.32 |
| Sodium salt of polycarboxylic acid (Dispex N40) | 1.00 | 1.00 |
| Nonionic surfactant (Triton CF10) | 0.24 | 0.24 |
| Coalescing solvent (Texanol) | 10.96 | 10.96 |
| Defoaming agent (Foamaster E75C) | 0.80 | 0.80 |
| Biocide (Nuosept 95) | 0.80 | 0.80 |
| Titanium dioxide (TIOXIDE TR92) | 142.36 | — |
| Composite pigment (dry weight) | — | 208.92 |
| Vinyl acetate/VeoVa emulsion (dry weight) | 176.97 | 110.00 |

| Test Results | Standard | Test |
| --- | --- | --- |
| Contrast Ratio @ 20 m$^2$/l | 89.60 | 90.93 |
| 60° Gloss | 47 | 65 |
| Spreading Rate (m$^2$/l) @ Contrast Ratio of 98% | 6.81 | 8.53 |

EXAMPLE 2

A pigment slurry was prepared by dispersing 758.4 g of titanium dioxide (TIOXIDE TR92) in 295.0 g of demineralised water. The pH of the slurry was adjusted to 4.5 by addition of hydrochloric acid and the slurry was subjected to high shear milling to effect thorough dispersion. An experimental methylmethacrylate-butylacrylate copolymer latex with an average particle size of 0.086 micrometer and a minimum film-forming temperature of 22° C. was adjusted to pH 4.5, and then 300 g of latex was mixed with 395.1 g of pigment slurry under conditions of high shear agitation. The resultant dispersion of composite particles was adjusted to pH 10 by the addition of ammonia. The total dry solids of the composite was 60.3% by weight and the volume ratio of emulsion particles to pigment particles was 1.96:1. A high gloss paint was then prepared containing the composite pigment such that the total volume solids of the paint was 39.5% and the pigment volume concentration was 19.2%. A paint made containing the same volume solids and concentration of pigment, but made in a manner consistent with conventional high gloss paint manufacture, was used as a standard.

The paints had the following composition:

|  | Parts by weight | |
| --- | --- | --- |
|  | Standard Paint | Test Paint |
| Water | 50.20 | 3.00 |
| Propylene glycol | 24.00 | 24.00 |
| Aminomethyl propanol (AMP95 - Ahgus Chemie) | 2.00 | 2.00 |
| Anti-foaming agent (Dehydran 1293 - Henkel) | 20.00 | 20.00 |
| Wetting agent (Surfynol 104E - Air Products) | 4.00 | 4.00 |
| Dispersant (Neocryl BT24 - Zeneca Resins) | 31.00 | 31.00 |
| Titanium dioxide (TIOXIDE TR92) | 240.00 |  |

-continued

|  | Standard | Test |
| --- | --- | --- |
| Composite pigment | — | 1152.00 |
| Acrylic emulsion | 592.00 | 592.00 |
| (Neocryl XK90 - Zeneca Resins) |  |  |
| Ethyl Diglycol | 43.00 | 43.00 |
| Associative thickener | 11.00 | 11.00 |
| (Tafigel PUR40 - Munzig Chemie) |  |  |
| Test Results | Standard | Test |
| Contrast Ratio @ 20 μm dry film thickness | 93.8 | 94.5 |
| 60° Gloss | 80 | 78 |
| Flocculation gradient | 0.70 | 0.42 |

COMPARATIVE EXAMPLE A

A pigment slurry was prepared by dispersing 189.3 g of titanium dioxide (TIOXIDE TR92) in 189.3 g of demineralised water. The pH of the slurry was adjusted to 4.5 by addition of hydrochloric acid and the slurry was subjected to high shear milling to effect thorough dispersion. An experimental polystyrene latex with an average particle size of 0.065 micrometer and a minimum film-forming temperature in excess of 50° C. was adjusted to pH 4.5 and then 100 g of latex was mixed with the pigment slurry under conditions of high shear agitation. The resultant dispersion of composite particles was adjusted to pH 8.5 by the addition of ammonia. The total dry solids of the composite was 49.8% by weight and the volume ratio of emulsion to pigment was 1.06:1. The composite pigment was then incorporated in a high gloss paint formulation such that the $TiO_2$ volume concentration was 20.0%. A paint made containing the same concentration of titanium dioxide, but made in a manner consistent with conventional high gloss paint manufacture, was used as a standard. The paints had the following composition:

|  | Parts by weight | |
| --- | --- | --- |
|  | Standard Paint | Test Paint |
| Water | 33.00 | 33.00 |
| Propylene glycol | 24.00 | 24.00 |
| Aminomethyl propanol (AMP95) | 2.00 | 2.00 |
| Anti-foaming agent (Dehydran 1293) | 20.00 | 20.00 |
| Wetting agent (Surfynol 104E) | 4.00 | 4.00 |
| Dispersant (Neocryl BT24) | 31.00 | 31.00 |
| Titanium dioxide (TIOXIDE TR92) | 240.00 | — |
| Composite pigment (dry weight) | — | 308.00 |
| Acrylic emulsion (Neocryl XK-90) | 596.90 | 447.20 |
| Ethyl Diglycol | 43.00 | 43.00 |
| Associative thickener (Coatex BR910) | 6.00 | 6.00 |
| Test Results | Standard | Test |
| Contrast Ratio @ 20 μm dry film thickness | 93.7 | 94.1 |
| 60° Gloss | 80 | 61 |

EXAMPLE 3

A pigment slurry was prepared by dispersing 184.2 g of titanium dioxide (TIOXIDE TR92) in 74.4 g of demineralised water. The pH of the slurry was adjusted to 4.5 by addition of hydrochloric acid and the slurry was subjected to high shear milling to effect thorough dispersion. An experimental methylmethacrylate-butylacrylate copolymer latex with an average particle size of 0.109 micrometer and a minimum film-forming temperature of 18° C. was adjusted to pH 4.5, and then 200 g of latex was mixed with the pigment slurry under conditions of high shear agitation. The resultant dispersion of composite particles was adjusted to pH 8.5 by the addition of ammonia. The total dry solids of the composite was 59.5% by weight and the volume ratio of emulsion particles to pigment particles was 1.99:1. A high gloss paint was then prepared containing the composite pigment such that the total volume solids of the paint was 38.5% and the pigment volume concentration was 19.2% A paint made containing the same volume solids concentration of pigment, but made in a manner consistent with conventional high gloss paint manufacture, was used as a standard. The paints had the following composition:

|  | Parts by weight | |
| --- | --- | --- |
|  | Standard Paint | Test Paint |
| Water | 71.20 | 30.50 |
| Propylene glycol | 24.00 | 24.00 |
| Aminomethyl propanol (AMP95 - Angus Chemie) | 2.00 | 2.00 |
| Anti-foaming agent (Dehydran 1293 - Henkel) | 20.00 | 20.00 |
| Wetting agent (Surfynol 104E - Air Products) | 4.00 | 4.00 |
| Dispersant (Neocryl BT24 - Zeneca Resins) | 31.00 | 31.00 |
| Titanium dioxide (TIOXIDE TR92) | 240.00 | — |
| Composite pigment | — | 1189.00 |
| Acrylic emulsion (Neocryl XK-90 - Zeneca Resins) | 592.00 | 592.00 |
| Ethyl Diglycol | 43.00 | 43.00 |
| Associative thickener (Tafigel PUR40-Munzig Chemie) | 11.00 | 11.00 |
| Paint Properties |  |  |
| Volume solids | 38.50% |  |
| Pigment volume concentration | 19.2% |  |
| Test Results | Standard | Test |
| Contrast Ratio @ 20 μm dry film thickness | 93.3 | 94.2 |
| 20° Gloss | 44 | 62 |
| 60° Gloss | 75 | 87 |
| Flocculation gradient | 0.70 | 0.54 |

We claim:

1. An aqueous gloss emulsion paint comprising a dispersion of composite particles, said composite particles consisting essentially of an association of at least one particle of an inorganic pigment with at least one polymeric particles, the polymeric particle being formed from a polymer having a minimum film forming temperature not greater than 50° C. or a copolymer having a minimum film-forming temperature not greater than 50° C., the composite particles having a composition such that the ratio of polymeric particles to particles of inorganic pigment is in the range 0.5:1 to 6:1 by volume, the particles of inorganic pigment having a surface charge and the polymeric particles having a surface charge, said surface charge on the polymeric particles being positive when the particles of inorganic pigment have negative surface charge and negative when the particles of inorganic pigment have a positive surface charge, the particles of inorganic pigment and the polymeric particles being held in association in the composite particles solely as a result of said surface charges, said paint forming a dried film having a 60° gloss greater than 70%.

2. An aqueous gloss emulsion paint according to claim 1 in which the inorganic pigment is selected from the group consisting of titanium dioxide pigments, zinc oxide pigments, antimony oxides, barium pigments, calcium pigments, zirconium pigments, chromium pigments, iron pigments, magnesium pigments, lead pigments, zinc sulphide and lithopone.

3. An aqueous gloss emulsion paint according to claim 1 in which the inorganic pigment is rutile titanium dioxide.

4. An aqueous gloss emulsion paint according to claim 1 in which the polymeric particles are formed from a polymer selected from the group consisting of polymers of acrylic acid, copolymers of acrylic acid, polymers of acrylic acid esters, copolymers of acrylic acid esters, styrene/acrylate copolymers, polyesters, polyurethanes, urethane/acrylate copolymers, styrene/butadiene copolymers, polyvinyl acetate polymers, polyvinyl acetate copolymers, alkyd resin emulsions and epoxy resin emulsions.

5. An aqueous gloss emulsion paint according to claim 1 in which the composite particles are formed from a plurality of inorganic pigments or a plurality of polymeric materials.

6. An aqueous gloss emulsion paint according to claim 1 in which the polymer or copolymer has a minimum film forming temperature of less than 25° C.

7. An aqueous gloss emulsion paint according to claim 1 in which the ratio of polymeric particles to inorganic pigment in the composite particles is in the range 1:1 to 4:1 by volume.

8. An aqueous gloss emulsion paint according to claim 1 in which the inorganic pigment is titanium dioxide having an average crystal size in the range 0.05 to 0.5 micrometer.

9. An aqueous gloss emulsion paint according to claim 8 in which the polymeric particles have an average size of from 0.02 to 0.5 micrometer.

10. A process of preparing an aqueous gloss emulsion paint comprising a dispersion of composite particles, said composite particles consisting essentially of an association of at least one particle of an inorganic pigment with at least one polymeric particle, comprising dispersing particles of said inorganic pigment in an aqueous medium at a pH at which said particles have a surface charge and dispersing said polymeric particles in an aqueous medium wherein said polymeric particles have a surface charge, said surface charge on the polymeric particles being positive when the dispersed particles of inorganic pigment have a negative surface charge and negative when the dispersed particles of inorganic pigment have a positive surface charge, mixing the dispersed particles of inorganic pigment with the dispersed polymeric particles under conditions such that the mixing does not produce a reversal of the sign of the surface charge on one of the particulate materials, thus forming composite particles in which the particles of inorganic pigment and the polymeric particles are held in association solely as a result of said surface charges, the polymeric particles being formed from a polymer or copolymer having a minimum film-forming temperature not greater than 50° C. and the composite particles having a composition such that the ratio of polymeric particles to particles of inorganic pigment is in the range 0.5:1 to 6:1 by volume, said paint forming a dried film having a 60° gloss greater than 70%.

11. A process according to claim 10 in which the pH of the dispersion of composite particles is adjusted to a value in the range 6 to 10 after formation of the composite particles.

12. A process according to claims 10 in which the inorganic pigment particles have a positive surface charge and the polymeric particles have a negative surface charge.

13. A process according to claim 10 in which the inorganic pigment is titanium dioxide having a surface coating of alumina and the particles of titanium dioxide are dispersed at a pH value below 6.

14. A process according to claim 10 which the dispersion of inorganic pigment is prepared in the absence of a dispersing agent.

15. A process according to claim 10 in which the polymeric particles are dispersed at a concentration in the range 40 to 65 per cent by weight.

16. A process according to claim 10 in which the particles of inorganic pigment are dispersed at a concentration in the range 50 to 80 per cent by weight.

17. A process according to claim 10 in which the dispersed particles of inorganic pigment and dispersed polymeric particles which are mixed have pH values which differ by not more than 1 pH unit.

18. A process according to claim 10 in which, during the step in which the dispersed particles of inorganic pigment are mixed with the dispersed polymeric particles, an acid or a base is added to adjust the pH of the dispersion formed.

19. An aqueous gloss emulsion paint prepared according to the process of claim 10 and having a pH value in the range 6 to 10.

20. An aqueous gloss emulsion paint comprising a dispersion of composite particles, said composite particles consisting essentially of an association of at least one particle of an inorganic pigment with at least one polymeric particle, the polymeric particle being formed from a polymer or copolymer having a minimum film forming temperature not greater than 50° C., the composite particles having a composition such that the ratio of polymeric particles to particles of inorganic pigment is in the range 0.5:1 to 6:1 by volume, the composite particles being obtainable by a process wherein particles of said inorganic pigment are dispersed in an aqueous medium at a pH at which said particles have a surface charge and said polymeric particles are dispersed in an aqueous medium wherein said polymeric particles have a surface charge, said surface charge on the polymeric particles being positive when the dispersed particles of inorganic pigment have a negative surface charge and negative when the dispersed particles of inorganic pigment have a positive surface charge, the dispersed particles of inorganic pigment are mixed with the dispersed polymeric particles under conditions such that the mixing does not produce a reversal of the sign of the surface charge on one of the particulate materials, thus forming composite particles in which the particles of inorganic pigment and the polymeric particles are held in association solely as a result of said surface charges and subsequently adjusting the pH of the dispersion of composite particles so formed to a value in the range of 6 to 10, said paint forming a dried film having a 60° gloss greater than 70%.

* * * * *